(12) United States Patent
Shikazono et al.

(10) Patent No.: US 8,266,900 B2
(45) Date of Patent: Sep. 18, 2012

(54) HEAT RECOVERY SYSTEM

(75) Inventors: Naoki Shikazono, Tokyo (JP); Koji Matsuoka, Okazaki (JP); Isamu Kandori, Nukata-gun (JP); Shiro Ikuta, Tokyo (JP); Tsunehito Wake, Tokyo (JP)

(73) Assignees: The University of Tokyo, Tokyo (JP); Futaba Industrial Co., Ltd., Aichi (JP); M-K Sale Co., Ltd., Tokyo (JP); Kandori Industry Ltd., Aichi (JP); Waki Factory Inc., Tokyo (JP)

( * ) Notice: Subject to any disclaimer, the term of this patent is extended or adjusted under 35 U.S.C. 154(b) by 340 days.

(21) Appl. No.: 12/734,455

(22) PCT Filed: Nov. 7, 2008

(86) PCT No.: PCT/JP2008/070346
§ 371 (c)(1),
(2), (4) Date: May 7, 2010

(87) PCT Pub. No.: WO2009/060957
PCT Pub. Date: May 14, 2009

(65) Prior Publication Data
US 2010/0251702 A1    Oct. 7, 2010

(30) Foreign Application Priority Data

Nov. 7, 2007    (JP) ................................. 2007-289954

(51) Int. Cl.
*F01N 5/02* (2006.01)
(52) U.S. Cl. .......... 60/320; 165/102; 165/103; 165/157; 165/159; 165/916
(58) Field of Classification Search .................... 60/320; 165/102, 103, 157, 159, 916
See application file for complete search history.

(56) References Cited

U.S. PATENT DOCUMENTS
4,796,694 A * 1/1989 Ikuta et al. ..................... 165/152
(Continued)

FOREIGN PATENT DOCUMENTS
DE    29 04 700 A1    8/1980
(Continued)

OTHER PUBLICATIONS

International Search Report issued in International Application No. PCT/JP2008/070346 on Dec. 9, 2008 (with English-language translation).

(Continued)

*Primary Examiner* — Thomas Denion
*Assistant Examiner* — Jason Shanske
(74) *Attorney, Agent, or Firm* — Oliff & Berridge, PLC (57) ABSTRACT

A plurality of flat tubes formed as a tube having notches by linearly cutting upper and lower parts from a hollow flat circular doughnut shape are stacked to structure a tube laminate. It is attached to a case so that a notch aligns with the notch and faces upward by an exhaust inflow end plate and that a notch aligns with the notch and faces downward by an exhaust outflow end plate. A cutoff valve is provided at an exhaust outflow end of an exhaust communication tube passing through the center of the tube laminate by heat insulation. While an internal combustion engine is warming up, the cutoff valve is closed to cause the exhaust to flow in gaps of the respective flat tubes from upward to downward as a whole and also a heat exchange medium is caused to flow in the respective flat tubes from downward to upward as a whole to have heat exchanged between the exhaust and the heat exchange medium to recover the exhaust heat.

12 Claims, 9 Drawing Sheets

U.S. PATENT DOCUMENTS

| | | | | |
|---|---|---|---|---|
| 5,014,775 A | * | 5/1991 | Watanabe | 165/167 |
| 5,117,904 A | * | 6/1992 | Bond | 165/159 |
| 5,203,832 A | * | 4/1993 | Beatenbough et al. | 165/41 |
| 5,238,057 A | * | 8/1993 | Schelter et al. | 165/158 |
| 5,343,936 A | * | 9/1994 | Beatenbough et al. | 165/41 |
| 5,363,823 A | * | 11/1994 | Gittlein | 123/196 AB |
| 5,472,045 A | * | 12/1995 | Poehlman | 165/119 |
| 5,513,702 A | * | 5/1996 | Tajima et al. | 165/167 |
| 5,787,977 A | * | 8/1998 | Yuasa et al. | 165/284 |
| 5,797,450 A | * | 8/1998 | Kawabe et al. | 165/167 |
| 6,167,951 B1 | * | 1/2001 | Couch et al. | 165/160 |
| 6,182,748 B1 | * | 2/2001 | Brost et al. | 165/167 |
| 6,446,712 B1 | * | 9/2002 | Wu et al. | 165/167 |
| 6,681,846 B2 | * | 1/2004 | Angermann et al. | 165/167 |
| 2002/0000310 A1 | * | 1/2002 | Cheadle | 165/167 |
| 2005/0039896 A1 | * | 2/2005 | Laine et al. | 165/157 |
| 2007/0199683 A1 | * | 8/2007 | Emrich | 165/125 |

FOREIGN PATENT DOCUMENTS

| | | |
|---|---|---|
| DE | 103 32 046 A1 | 2/2005 |
| JP | U-62-112473 | 7/1987 |
| JP | 02110294 A * | 4/1990 |
| JP | A-2007-032561 | 2/2007 |
| JP | A-2007-247556 | 9/2007 |

OTHER PUBLICATIONS

International Preliminary Report on Patentability in International Application No. PCT/JP2008/070346; dated Jun. 29, 2010 (with English-language translation).

* cited by examiner

HEAT RECOVERY SYSTEM

TECHNICAL FIELD

The present invention relates to a heat recovery system and more specifically pertains to a heat recovery system configured to recover heat from the emission of an internal combustion engine.

BACKGROUND ART

One proposed structure of a heat recovery system has a heat exchange path arranged to perform heat exchange between emission of an internal combustion engine and a heat exchange medium, a bypass path arranged to discharge the emission with bypassing the heat exchange path, and a heat insulating layer coaxially arranged with the heat exchange path and the bypass path and formed between the heat exchange path and the bypass path (see, for example, Japanese Patent Laid-Open No. 2007-32561). In this prior art heat recovery system, the heat insulating layer is formed around the outer circumference of the bypass path, and the heat exchange path is formed around the outer circumference of the heat insulating layer. A heat exchange medium flow path is further formed around the outer circumference of the heat exchange path. A valve is provided in the bypass path to shut off the bypass path. During warm-up of the internal combustion engine, the valve provided in the bypass path is closed to shut off the bypass path. In this state, the emission of the internal combustion engine flows through the heat exchange path. The heat exchange medium is heated by the heat exchange with the emission flowing through the heat exchange path and is used to heat up the cooling water flowing through the internal combustion engine. This accelerates the warm-up of the internal combustion engine. After completion of the warm-up of the internal combustion engine, the valve provided in the bypass path is opened to release the shutoff of the bypass path. In this state, the emission of the internal combustion engine flows through the bypass path and is discharged to the downstream. In the heat recovery system of this prior art structure, the heat insulating layer prevents the heat exchange medium from being overheated.

DISCLOSURE OF THE INVENTION

The heat recovery system used for recovery of heat from the emission of the internal combustion engine is typically mounted on a vehicle. There is accordingly a demand for a small-sized, high-performance, and highly-durable heat recovery system. One issue to be solved is discharge of the moisture or the water content in the emission condensed in the course of heat recovery. Another issue to be solved is vaporization of a liquid heat exchange medium in the course of heat exchange.

There would thus be a requirement for providing small-sized and high-performance heat recovery system.

The present invention accomplishes at least part of the requirement mentioned above and the other relevant requirements by the heat recovery system according to any of various aspects and applications discussed below.

A first aspect of the invention is directed to a heat recovery system configured to recover heat from emission of an internal combustion engine. The heat recovery system includes: a tubular casing; a tube stack created by stacking multiple flat tubes, each being formed in a flat, substantially donut shape and being structured to have at least two non-contact areas that are not in contact with inside of the casing, wherein the multiple flat tubes are stacked in a stacking direction at preset stacking intervals defined by at least two communication paths and are interconnected in the stacking direction by means of the at least two communication paths, such that the at least two non-contact areas of the multiple flat tubes are respectively aligned in sequence in the stacking direction and the at least two communication paths are respectively aligned in sequence in the stacking direction; a heat exchange medium supply pipe connected with respective one communication paths of the at least two communication paths aligned in sequence in the tube stack, in order to supply a heat exchange medium; a heat exchange medium recovery pipe connected with respective other communication paths of the at least two communication paths aligned in sequence in the tube stack, in order to recover the heat exchange medium; an emission inflow-side end plate located at an emission inflow end of the tube stack on an emission inflow side of the casing and attached to the casing, so as to block respective one non-contact areas of the at least two non-contact areas aligned in sequence in the tube stack; an emission outflow-side end plate located at an emission outflow end of the tube stack on an emission outflow side of the casing and attached to the casing, so as to block respective other non-contact areas of the at least two non-contact areas aligned in sequence in the tube stack; an emission flow conduit inserted through inside of the tube stack to have a heat insulating effect and arranged to pass through the tube stack and make a flow of the emission; and a shutoff valve provided in the emission flow conduit to shut off the flow of the emission and release the shutoff of the flow of the emission.

In the heat recovery system according to this aspect of the invention, during warm-up of the internal combustion engine, the shutoff valve is closed to shut off the flow of the emission through the emission flow conduit. In this state, the emission of the internal combustion engine flows in through the non-contact areas that are not blocked by the emission inflow-side end plate, is supplied to the intervals of the respective flat tubes in the tube stack, passes through the non-contact areas that are not blocked by the emission outflow-side end plate, and flows out to be discharged to the downstream. The heat exchange medium, on the other hand, flows in from the heat exchange medium supply pipe to one of the at least two communication paths provided in the tube stack, is supplied into the respective flat tubes in the tube stack, is heated by means of heat exchange with the emission flowing through the intervals of the respective flat tubes, passes through the other of the at least two communication paths, and flows out to the heat exchange medium recovery pipe to be recovered. The recovered hot heat exchange medium may be supplied, for example, to a heat exchange unit for heat exchange with the flow of cooling water through the internal combustion engine to accelerate the warm-up of the internal combustion engine. After completion of the warm-up of the internal combustion engine, the shutoff valve is opened to release the shutoff of the emission flow through the emission flow conduit. In this state, the emission of the internal combustion engine is not supplied to the tube stack but flows through the emission flow conduit to be discharged to the downstream. In the heat recovery system according to this aspect of the invention, the tube stack used for heat exchange is created by stacking multiple flat tubes formed in a flat, substantially donut shape with high density. This arrangement desirably attains the small-sized, high-performance heat recovery system. In the heat recovery system of the invention, the shutoff valve is provided in the emission flow conduit. During warm-up of the internal combustion engine, the shutoff valve is closed to shut off the flow of the emission through the emission flow conduit. This arrangement assures the efficient recovery of heat from the emission at a start of the internal combustion engine. The emission flow conduit is arranged to be in contact with the inside of the tube stack and to have the heat insulating effect. After completion of the warm-up of the internal combustion engine, the shutoff valve is opened to release the shutoff of the emission flow through the emission flow conduit. This arrangement effectively prevents the heat exchange medium from being overheated by the high-temperature emission of the warmed-up internal combustion engine.

In one preferable application of the heat recovery system according to the above aspect of the invention, one of the emission inflow-side end plate and the emission outflow-side end plate is attached to the casing with being bonded to one end of the tube stack, and the other of the emission inflow-side end plate and the emission outflow-side end plate is attached to the casing without being bonded to the other end of the tube stack. Even when the casing and the tube stack have different rates of thermal expansion, this arrangement desirably reduces the effect of a stress potentially applied to the tube stack, compared with a conventional arrangement where both the emission inflow-side end plate and the emission outflow-side end plate are attached to the casing with being bonded to the tube stack. Namely this arrangement effectively protects the tube stack from the potential deformation or damage due to application of the stress, thus enhancing the durability of the heat recovery system.

In another preferable application of the heat recovery system according to the above aspect of the invention, the tube stack is created by stacking the multiple flat tubes to be interconnected by means of the at least two communication paths formed in respective neighborhoods of the at least two non-contact areas. This arrangement enables the overall flow of the heat exchange medium and the overall flow of the emission to be opposed to each other or to be parallel to each other.

In still another preferable application of the heat recovery system according to the above aspect of the invention, the heat exchange medium supply pipe and the heat exchange medium recovery pipe are attached either to the emission inflow end of the tube stack on the emission inflow side of the casing or to the emission outflow end of the tube stack on the emission outflow side of the casing. In one preferable structure of the heat recovery system of this application, one of the emission inflow-side end plate and the emission outflow-side end plate that is located on a side with the heat exchange medium supply pipe and the heat exchange medium recovery pipe may be attached to the casing with being bonded to the end of the tube stack. The other of the emission inflow-side end plate and the emission outflow-side end plate that is located on a side without the heat exchange medium supply pipe and the heat exchange medium recovery pipe may be attached to the casing without being bonded to the end of the tube stack. This arrangement desirably reduces the effect of a stress potentially applied to the heat exchange medium supply pipe and the heat exchange medium recovery pipe due to the different thermal expansion rates of the casing and the tube stack. Namely this arrangement effectively protects the heat exchange medium supply pipe and the heat exchange medium recovery pipe from the potential deformation or damage due to application of the stress, thus enhancing the durability of the heat recovery system.

In another preferable application of the heat recovery system according to the above aspect of the invention, the emission inflow-side end plate, the emission outflow-side end plate, and the tube stack are attached to the casing, such that the one non-contact areas of the at least two non-contact areas aligned in sequence in the tube stack and blocked by the emission inflow-side end plate are provided as lower non-contact areas located in a lower portion of the casing and the other non-contact areas of the at least two non-contact areas aligned in sequence in the tube stack and blocked by the emission outflow-side end plate are provided as upper non-contact areas located in an upper portion of the casing. Even when the water content in the emission condensed and flowed down in the form of dew drops in the process of heat exchange, this arrangement enables the condensed water to be flowed out to the downstream. In one preferable embodiment of the heat recovery system of this application, the at least two communication paths respectively aligned in sequence in the tube stack are arranged to make an upward flow of the heat exchange medium inside the respective flat tubes. This arrangement enables the overall flow of the heat exchange medium and the overall flow of the emission to be opposed to each other, thus enhancing the heat exchange efficiency of the heat recovery system.

In the heat recovery system of the invention with the arrangement where the one non-contact areas blocked by the emission inflow-side end plate are located in the lower portion of the casing and the other non-contact areas blocked by the emission outflow-side end plate are located in the upper portion of the casing, the casing may be structured to have an emission outflow path arranged to be substantially horizontal with or to be downward inclined relative to the lower non-contact areas blocked by the emission inflow-side end plate or may alternatively be structured to have an axis of an emission outflow path decentered downward relative to an axis of an emission inflow path. This arrangement enables the water content in the emission condensed and flowed down in the form of dew drops in the process of heat exchange to be readily discharged with the emission flow.

In one preferable structure of the heat recovery system according to the above aspect of the invention, the emission flow conduit has two hollow pipes of different diameters arranged coaxially across a preset gap formed as a heat insulating layer. In another preferable structure of the heat recovery system according to the above aspect of the invention, the shutoff valve is located either on an emission inlet opening of the emission flow conduit or on an emission outlet opening of the emission flow conduit.

In one preferable embodiment of the heat recovery system according to the above aspect of the invention, the tube stack has fins provided in at least partial area between respective adjacent pairs of the multiple flat tubes. This arrangement desirably enhances the efficiency of heat recovery. In the heat recovery system of this embodiment, the fins may be provided to support the multiple flat tubes in the stacking direction. This arrangement desirably protects the individual flat tubes and the tube stack from deformation and allows for reduction of the wall thickness of the individual flat tubes.

BEST MODES OF CARRYING OUT THE INVENTION

Figure 1:
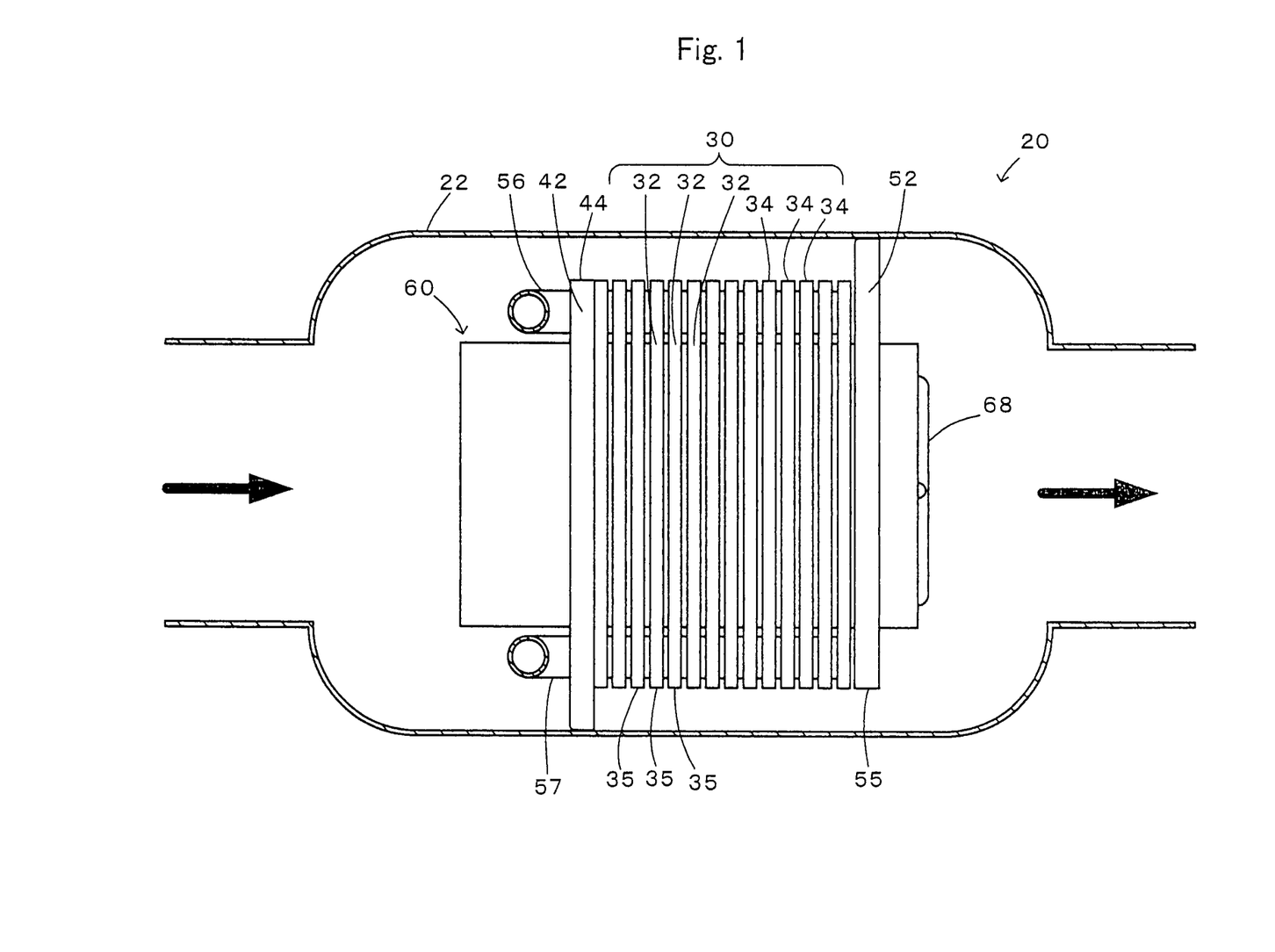
FIG. 1 is a diagrammatic representation of the general configuration of a heat recovery system 20 in accordance with one embodiment of the invention.
Figure 2:
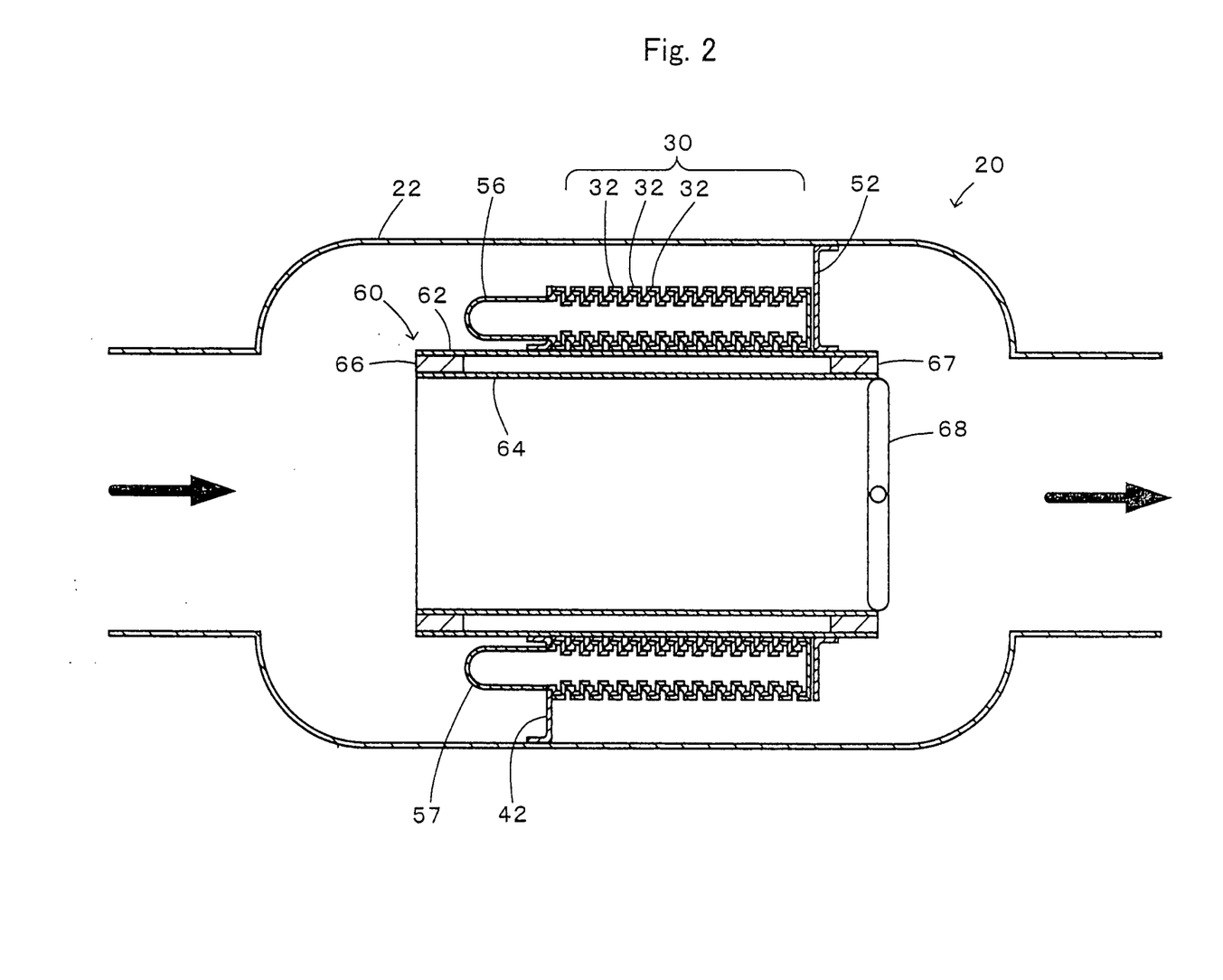
FIG. 2 is a diagrammatic cross sectional view representation of the heat recovery system 20 of the embodiment.

Some modes of carrying out the invention are described below with reference to the accompanied drawings. FIG. 1 is a diagrammatic representation of the general configuration of a heat recovery system 20 in accordance with one embodiment of the invention. FIG. 2 is a diagrammatic cross sectional view representation of the heat recovery system 20 of the embodiment. As illustrated, the heat recovery system 20 of the embodiment includes a casing 22 attached to an exhaust pipe of the internal combustion engine, a tube stack 30 created by stacking multiple donut-shaped, hollow flat tubes 32, an emission inflow-side end plate 42 attached to and bonded to one end flat tube 32 located on an emission inflow end of the tube stack 30 and fastened to the casing 22, an emission outflow-side end plate 52 arranged by a preset distance away from the other end flat tube 32 located on an emission outflow end of the tube stack 30 to be not in direct contact with the other end flat tube 32 and fastened to the casing 22, an emission flow conduit 60 arranged to pass through the center of the flat tubes 32, and a shut-off valve 68 attached to an emission outflow end of the emission flow conduit 60 to shut off the flow of the emission through the emission flow conduit 60 and release the shut-off.

Figure 3:
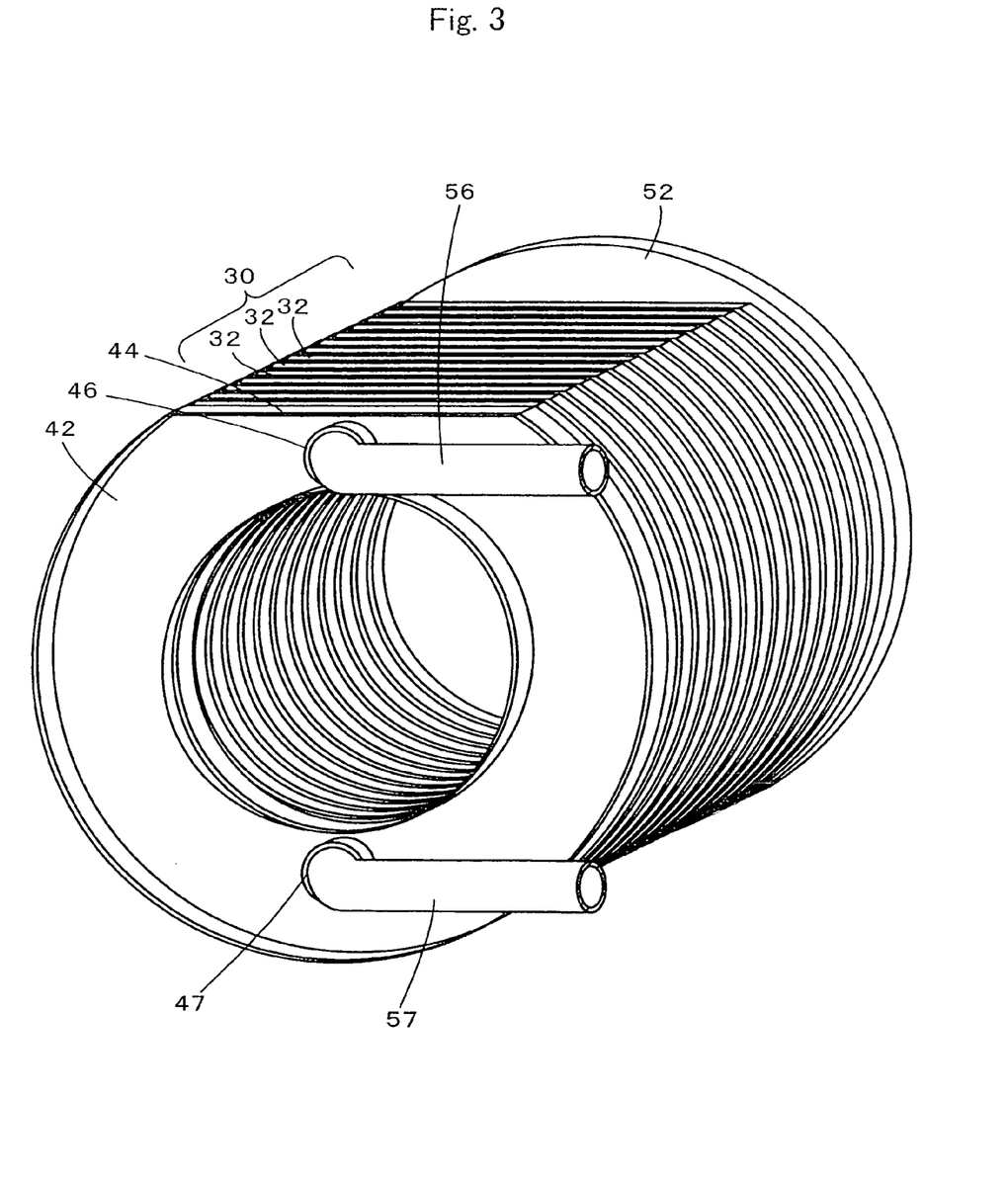
FIG. 3 is a diagrammatic perspective representation of the appearance of a tube stack 30.
Figure 4:
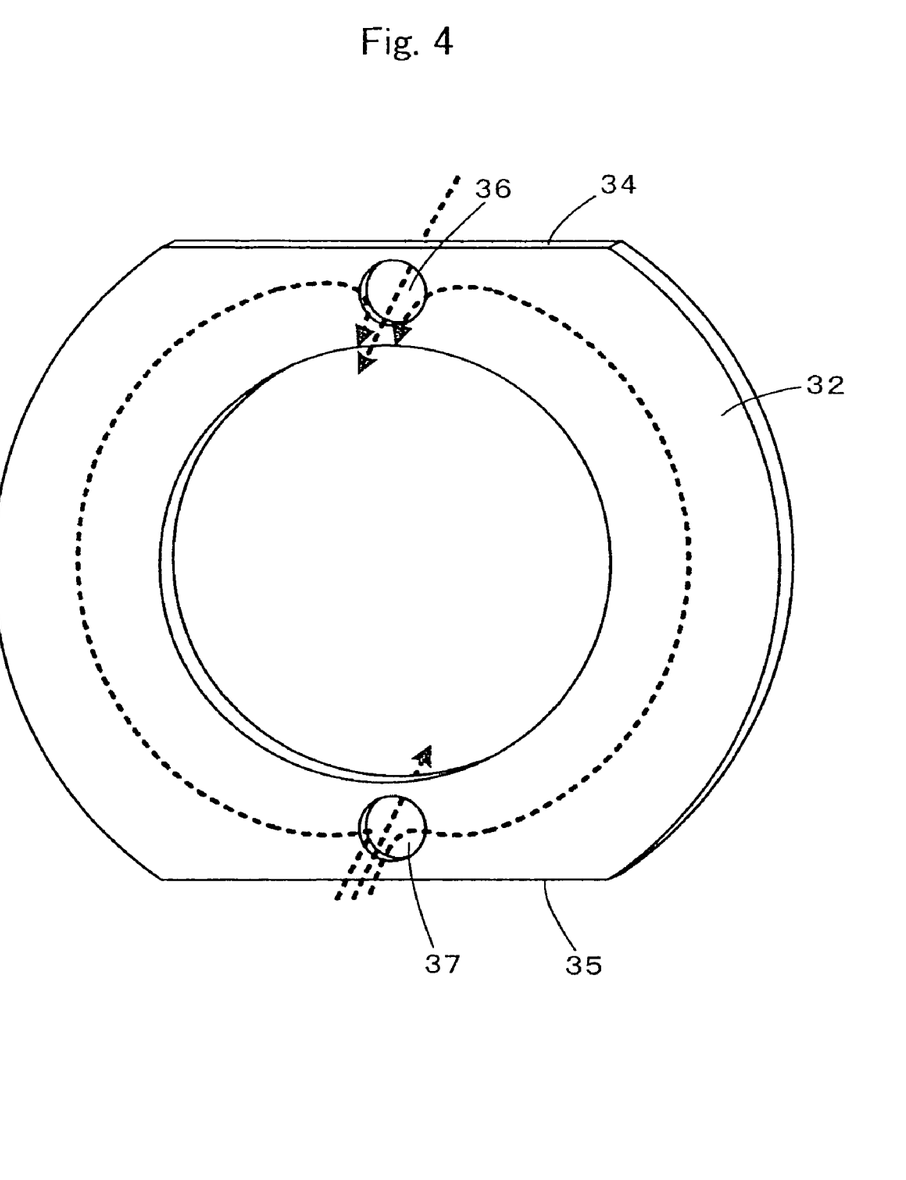
FIG. 4 is a diagrammatic representation of the schematic structure of a flat tube 32.

FIG. 3 is a diagrammatic perspective representation of the appearance of the tube stack 30. FIG. 4 is a diagrammatic representation of the schematic structure of the flat tube 32. Broken line arrows in FIG. 4 represent the flows of a heat exchange medium. As illustrated in FIG. 4, each of the flat tubes 32 may be provided by punching or bending a plate of a certain material with high heat resistance and high corrosion resistance (for example, stainless steel). The flat tube 32 is formed to have upper and lower cutout areas 34 and 35 obtained by linearly cutting off an upper arc-shape and a lower arc-shape from a hollow, flat, and circular donut-shape. An upper communication pipe element 36 and a lower communication pipe element 37 are formed on respective centers of the upper and lower cutout areas 34 and 35 in each flat tube 32. In a stack of multiple flat tubes 32, the upper communication pipe elements 36 formed in the respective flat tubes 32 are aligned and interconnected to form an upper flow path, while the lower communication pipe elements 37 formed in the respective flat tubes 32 are aligned and interconnected to form a lower flow path. As shown in FIG. 3, multiple flat tubes 32 are stacked such that a sequence of the upper cutout areas 34 and a sequence of the lower cutout areas 35 are aligned respectively and a sequence of the upper communication pipe elements 36 and a sequence of the lower communication pipe elements 37 are aligned and interconnected respectively. The stacked flat tubes 32 are joined together by, for example, brazing to complete the tube stack 30. The respective flat tubes 32 of the tube stack 30 are arranged at intervals corresponding to the communication pipe elements 36 and 37 as shown in FIGS. 1 through 3. The intervals of the respective flat tubes 32 form the flow paths of the emission.

Each of the emission inflow-side end plate 42 and the emission outflow-side end plate 52 is also formed by punching or bending a plate of a certain material with high heat resistance and high corrosion resistance (for example, stainless steel). The emission inflow-side end plate 42 is formed in a planar shape equivalent to the planar shape of the flat tube 32 without the cutout area 35. The emission outflow-side end plate 52 is formed in a planar shape equivalent to the planar shape of the flat tube 32 without the cutout area 34. Namely the emission inflow-side end plate 42 has a cutout area 44 corresponding to the cutout area 34, while the emission outflow-side end plate 52 has a cutout area 55 corresponding to the cutout area 35. The emission inflow-side end plate 42 is connected with the end flat tube 32 on the emission inflow end of the tube stack 30 such that the cutout area 44 of the emission inflow-side end plate 42 is aligned with the cutout area 34 of the end flat tube 32. The emission inflow-side end plate 42 has a circumferential end attached to the casing 22 such that the cutout areas 34 of the respective flat tubes 32 included in the tube stack 30 and the cutout area 44 of the emission inflow-side end plate 42 face upward along a vertical axis in the casing 22. The emission accordingly flows into the tube stack 30 through an inlet opening or an upper void defined by the casing 22 and the cutout area 44 of the emission inflow-side end plate 42. The emission outflow-side end plate 52 is connected with the end flat tube 32 on the emission outflow end of the tube stack 30 across a preset interval (for example, 3 mm) such that the cutout area 55 of the emission outflow-side end plate 52 is aligned with the cutout area 35 of the end flat tube 32. The emission outflow-side end plate 52 has a circumferential end attached to the casing 22 such that the cutout areas 35 of the respective flat tubes 32 included in the tube stack 30 and the cutout area 55 of the emission outflow-side end plate 52 face downward along the vertical axis in the casing 22. The emission accordingly flows out of the tube stack 30 through an outlet opening or a lower void defined by the casing 22 and the cutout area 55 of the emission outflow-side end plate 52. Namely the emission of the internal combustion engine flows through a void (inlet opening) formed by the cutout area 44 of the emission inflow-side end plate 42 into the tube stack 30, and flows through a void (inflow path) defined by the cutout areas 34 of the respective flat tubes 32 and the casing 22 to be supplied to the intervals between the respective flat tubes 32. The emission passes through the intervals between the respective flat tubes 32 to reach the cutout areas 35 of the respective flat tubes 32, flows through a void (outflow path) defined by the cutout areas 35 of the respective flat tubes 32 and the casing 22, and flows out of a void (outlet opening) formed by the cutout area 55 of the emission outflow-side end plate 52. Namely there is an overall downward flow of the emission through the intervals of the respective flat tubes 32.

The emission inflow-side end plate 42 has an upper communication pipe element 46 and a lower communication pipe element 47 that are respectively equivalent to the upper communication pipe elements 36 and the lower communication pipe elements 37 formed in the respective flat tubes 32 included in the tube stack 30. A heat exchange medium recovery pipe 56 is attached to the upper communication pipe element 46 formed in the neighborhood of the cutout area 44, while a heat exchange medium supply pipe 57 is attached to the lower communication pipe element 47. Both the heat exchange medium supply pipe 57 and the heat exchange medium recovery pipe 56 are located on the emission inflow side of the tube stack 30 in the heat recovery system 20. A heat exchange medium (for example, an oil or an antifreeze liquid) is supplied from the heat exchange medium supply pipe 57 into the lower flow path formed by the lower communication pipe elements 37 and is subsequently distributed into the respective flat tubes 32 included in the tube stack 30. The heat exchange medium flows inside the respective flat tubes 32 to reach the respective upper communication pipe elements 36 as shown by the broken line arrows in FIG. 4. The heat exchange medium then flows through the upper flow path formed by the upper communication pipe elements 36 and is recovered from the heat exchange medium recovery pipe 56. Namely there is an overall upward flow of the heat exchange medium inside the respective flat tubes 32 included in the tube stack 30. As described above, while the emission of the internal combustion engine overall flows downward through the intervals of the respective flat tubes 32, the heat exchange medium overall flows upward within the respective flat tubes 32. Heat exchange is accordingly performed between the overall upward flow of the heat exchange medium and the overall downward flow of the emission.

As illustrated in FIG. 2, the emission flow conduit 60 includes an outer pipe 62 or a hollow pipe bonded to an inner wall of the donut-shaped center hole of the tube stack 30 and an inner pipe 64 or a hollow pipe attached to inside of the outer pipe 62 via two ring-shaped spacers 66 and 67. A shutoff valve 68 is provided on an emission outflow end of the inner pipe 64. The gap between the outer pipe 62 and the inner pipe 64 forms a space for heat insulation and prevents the tube stack 30 from becoming high temperature and overheating the heat exchange medium during a high-temperature flow of the emission through the inside of the inner tube 64. An on-off actuator (not shown) is attached to the shutoff valve 68. The on-off control of the shutoff valve 68 is performed by a controller (not shown) for controlling the operations of the internal combustion engine.

Figure 5:
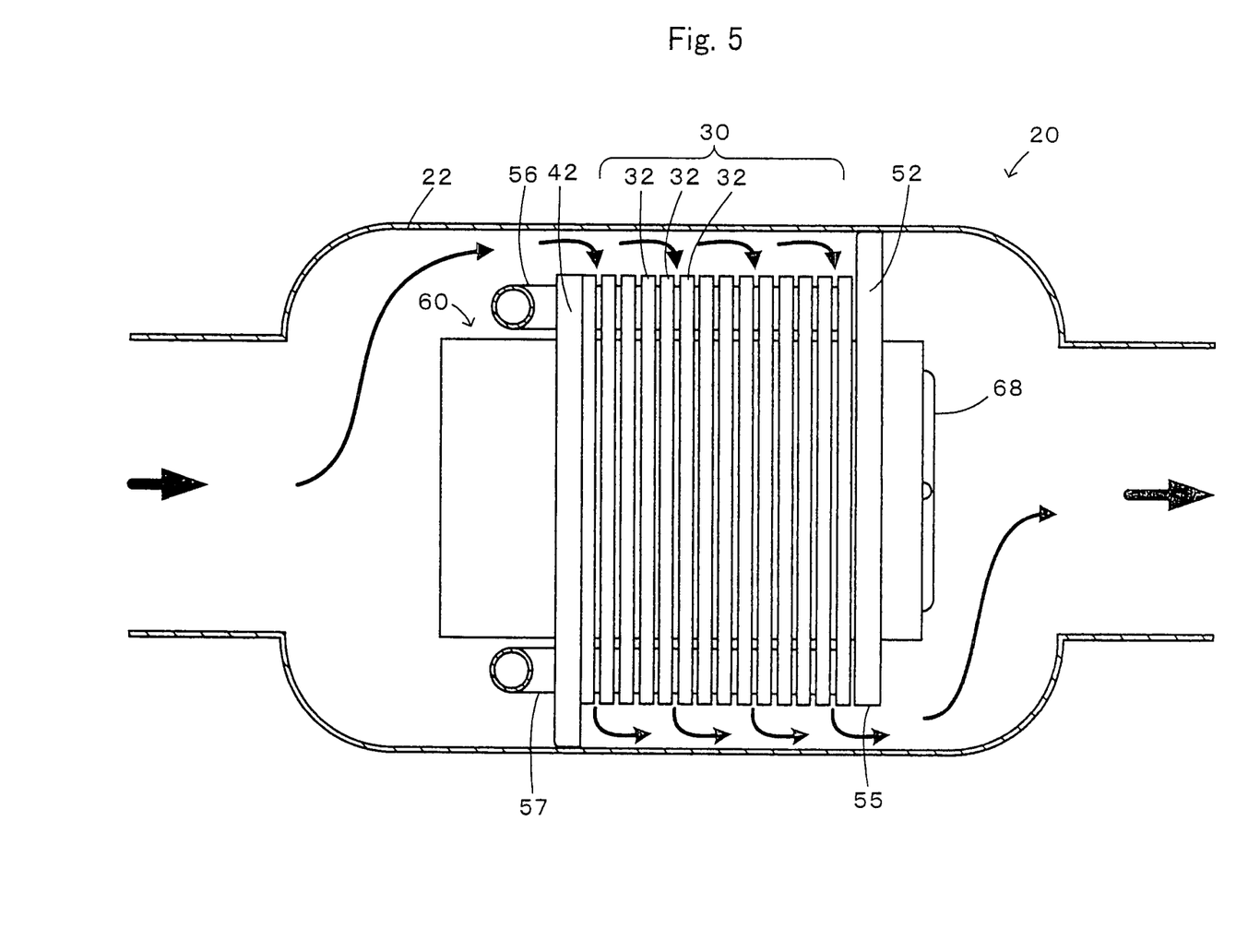
FIG. 5 is an explanatory view showing the flows of emission on the occasion of shutting off the emission flow through an emission flow conduit 60 by a shut-off valve 68 during warm-up of an internal combustion engine.
Figure 6:
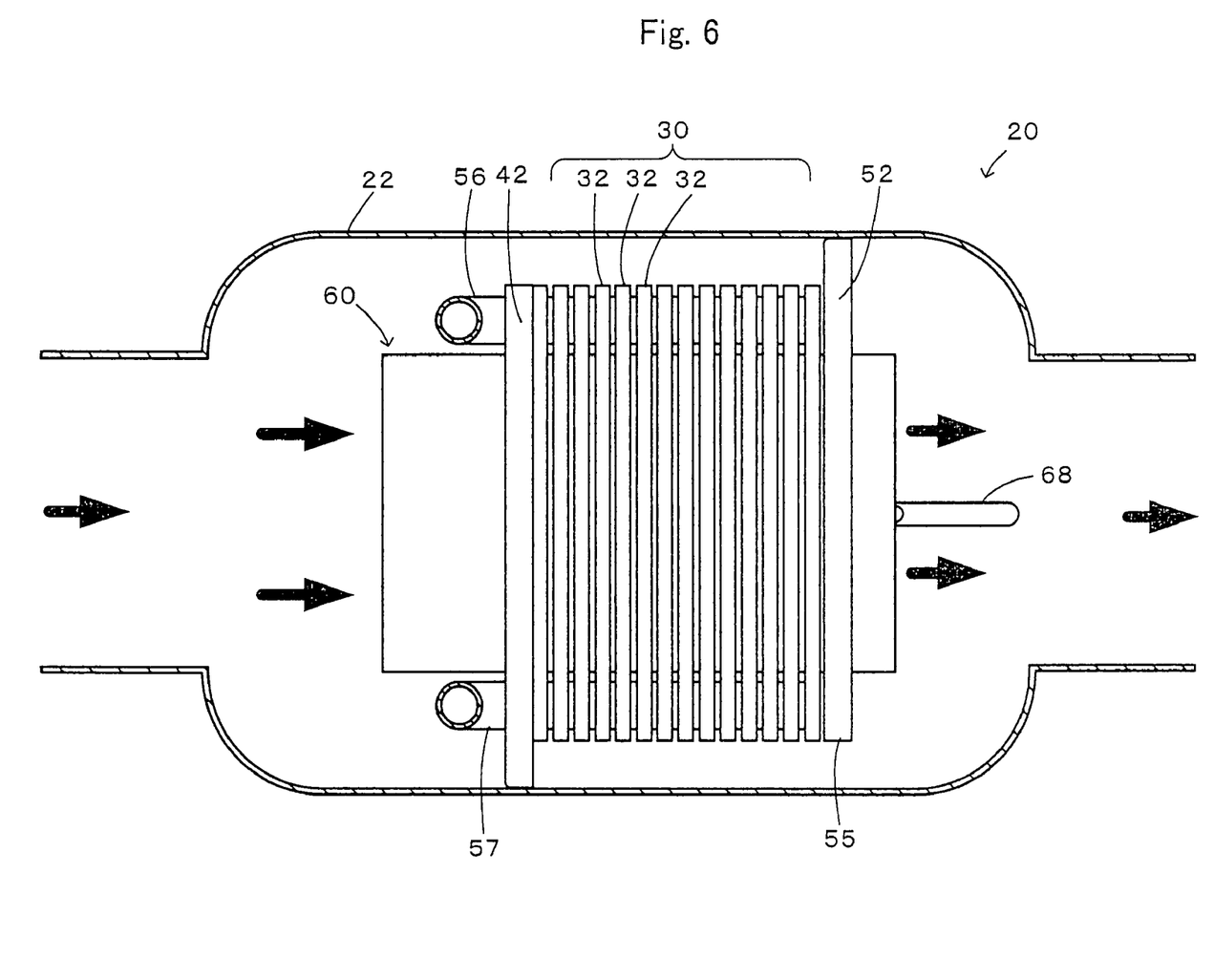
FIG. 6 is an explanatory view showing the flows of emission on the occasion of terminating the warm-up of the internal combustion engine and releasing the shut-off of the emission flow through the emission flow conduit 60 by the shut-off valve 68.

The operations of the heat recovery system 20 thus constructed are described below. FIG. 5 is an explanatory view showing the flows of the emission in a state of shutting off the flow of the emission through the emission flow conduit 60 by means of the shutoff valve 68 during warm-up of the internal combustion engine. FIG. 6 is an explanatory view showing the flows of the emission in a state of releasing the shutoff of the emission flow through the emission flow conduit 60 by means of the shutoff valve 68 after completion of the warm-up of the internal combustion engine. During warm-up of the internal combustion engine, the shutoff valve 68 is closed to prohibit the flow of the emission through the emission flow conduit 60. As shown in FIG. 5, the emission of the internal combustion engine flows through the void (inlet opening) formed by the cutout area 44 of the emission inflow-side end plate 42 into the tube stack 30, and flows through the void (inflow path) defined by the cutout areas 34 of the respective flat tubes 32 and the casing 22 to be supplied to the intervals between the respective flat tubes 32. Namely there is an overall downward flow of the emission through the intervals of the respective flat tubes 32. The heat exchange is accordingly performed between the overall downward flow of the emission and an overall upward flow of the heat exchange medium in the respective flat tubes 32. The emission cooled down by the heat exchange flows through the void (outflow path) defined by the cutout areas 35 of the respective flat tubes 32 and the casing 22, and flows out of the void (outlet opening) formed by the cutout area 55 of the emission outflow-side end plate 52 to the downstream. The flow of the heat exchange medium heated by the heat exchange with the high-temperature emission flow and recovered from the heat exchange medium recovery pipe 56 is subjected to heat exchange with the flow of cooling water circulated through the internal combustion engine and thereby heats up the flow of cooling water, as well as a battery. When the cooling water for the internal combustion engine is used as the heat exchange medium itself, the emission flow directly heats up the flow of cooling water for the internal combustion engine. Cooling down the emission flow by such heat exchange may cause the moisture or the water content in the emission to be condensed on the outer surfaces of the respective flat tubes 32 and flowed down in the form of dew drops in the tube stack 30. The emission flow causes the flowing-down dew drops to pass through the void (outflow path) defined by the cutout areas 35 of the respective flat tubes 32 and the casing 22 and to be discharged through the void (outlet opening) formed by the cutout area 55 of the emission outflow-side end plate 52 to the downstream. After completion of the warm-up of the internal combustion engine, the shutoff valve 68 is opened to release the shutoff of the emission flow through the emission flow conduit 60. As shown in FIG. 6, the emission from the internal combustion engine accordingly passes through the emission flow conduit 60 and is discharged to the downstream. The heat insulating function of the gap between the outer pipe 62 and the inner pipe 64 effectively prevents the tube stack 30 from becoming high temperature and overheating the flow of the heat exchange medium.

In the heat recovery system 20 of the embodiment described above, during the warm-up of the internal combustion engine, the shutoff valve 68 is closed to shut off the flow of the emission through the emission flow conduit 60. This shutoff of the emission flow causes the emission of the internal combustion engine to flow overall downward through the intervals of the respective flat tubes 32 included in the tube stack 30. The heat exchange medium, on the other hand, flows overall upward within the respective flat tubes 32. This arrangement assures the effective heat exchange between the flow of the heat exchange medium and the emission flow and thereby enhances the efficiency of heat recovery from the emission of the internal combustion engine. This desirably attains the high performance and the size reduction of the heat recovery system. The emission outflow-side end plate 52 is attached to the casing 22 such that the emission outflow-side end plate 52 is not in direct contact with the end flat tube 32 on the emission outflow end of the tube stack 30 but is connected with the end flat tube 32 across the preset interval (for example, 3 mm). Even when the casing 22 and the tube stack 30 have different rates of thermal expansion, this arrangement effectively prevents a stress induced by the difference between the thermal expansion rates from being applied to the tube stack 30 or the emission outflow-side end plate 52. Namely this arrangement desirably protects the tube stack 30, the emission outflow-side end plate 52, and the emission inflow-side end plate 42 from the potential deformation or damage due to application of the stress induced by the different rates of thermal expansion, thus enhancing the durability of the heat recovery system. The heat exchange medium supply pipe 57 and the heat exchange medium recovery pipe 56 are provided on the inflow side of the emission (on the side of the emission inflow-side end plate 42) in the tube stack 30 of the heat recovery system 20. Even when the casing 22 and the tube stack 30 have different rates of thermal expansion, this arrangement effectively prevents a stress induced by the difference between the thermal expansion rates from being applied to the heat exchange medium supply pipe 57 or the heat exchange medium recovery pipe 56. Namely this arrangement desirably protects the heat exchange medium supply pipe 57 and the heat exchange medium recovery pipe 56 from the potential deformation or damage due to application of the stress induced by the different rates of thermal expansion, thus enhancing the durability of the heat recovery system. The emission inflow-side end plate 42, the tube stack 30, and the emission outflow-side end plate 52 are arranged such that the cutout area 44 of the emission inflow-side end plate 42 face upward along the vertical axis, the cutout areas 34 and 35 of the tube stack 30 respectively face upward and downward along the vertical axis, and the cutout area 55 of the emission outflow-side end plate 52 face downward along the vertical axis. This arrangement enables the moisture or the water content in the emission condensed on the outer surface of the respective flat tubes 32 and flowed down in the form of dew drops along the vertical axis of the flat tubes 32 to be readily discharged with the emission flow through the void (outlet opening) formed by the cutout area 55 of the emission outflow-side end plate 52 to the downstream. The heat exchange medium supply pipe 57 is provided to be connected with the lower communication pipe elements 37 located in the vertically lower positions of the respective flat tubes 32 included in the tube stack 30. The heat exchange medium recovery pipe 56 is provided to be connected with the upper communication pipe elements 36 located in the vertically upper positions of the respective flat tubes 32 included in the tube stack 30. The heat exchange medium then flows overall upward within the respective flat tubes 32. Even when a liquid used as the heat exchange medium is overheated to be vaporized, this arrangement enables the vapor of the heat exchange medium from being effectively recovered from the vertically upper position of the tube stack 30. After completion of the warm-up of the internal combustion engine, the shutoff valve 68 is opened to release the shutoff of the emission flow through the emission flow conduit 60. The emission of the internal combustion engine can thus be flowed through the emission flow conduit 60 with the heat insulating effect to be discharged to the downstream. This arrangement effectively prevents the tube stack 30 from becoming high temperature and overheating the flow of the heat exchange medium.

In the heat recovery system 20 of the embodiment discussed above, the emission inflow-side end plate 42 is attached to the casing 22 with being bonded to the end flat tube 32 on the emission inflow end in the tube stack 30. The emission outflow-side end plate 52 is, on the other hand, attached to the casing 22 with being connected to the end flat tube 32 on the emission outflow end in the tube stack 30 across the preset interval (for example, 3 mm) to be not in direct contact with the end flat tube 32. In one modified application, the emission inflow-side end plate 42 may be attached to the casing 22 with being connected to the end flat tube 32 on the emission inflow end in the tube stack 30 across a preset interval (for example, 3 mm) to be not in direct contact with the end flat tube 32. The emission outflow-side end plate 52 may be attached to the casing 22 with being bonded to the end flat tube 32 on the emission outflow end in the tube stack 30. In this modified structure, the heat exchange medium supply pipe 57 and the heat exchange medium recovery pipe 56 are preferably provided on the outflow side of the emission (on the side of the emission outflow-side end plate 52) in the tube stack 30 of the heat recovery system 20. Alternatively the heat exchange medium supply pipe 57 and the heat exchange medium recovery pipe 56 may be provided on the inflow side of the emission (on the side of the emission inflow-side end plate 42) in the tube stack 30 of the heat recovery system 20. In another modified application, both the emission inflow-side end plate 42 and the emission outflow-side end plate 52 may be attached to the casing 22 with being bonded respectively to the end flat tube 32 on the emission inflow end in the tube stack 30 and to the end flat tube 32 on the emission outflow end in the tube stack 30.

In the heat recovery system 20 of the embodiment discussed above, both the heat exchange medium supply pipe 57 and the heat exchange medium recovery pipe 56 are provided on the inflow side of the emission (on the side of the emission inflow-side end plate 42) in the tube stack 30 of the heat recovery system 20. In one modified structure, the heat exchange medium recovery pipe 56 may be provided on the outflow side of the emission in the tube stack 30 of the heat recovery system 20, while the heat exchange medium supply pipe 57 may be provided on the inflow side of the emission in the tube stack 30 of the heat recovery system 20. In another modified structure, on the contrary, the heat exchange medium supply pipe 57 may be provided on the outflow side of the emission in the tube stack 30 of the heat recovery system 20, while the heat exchange medium recover pipe 56 may be provided on the inflow side of the emission in the tube stack 30 of the heat recovery system 20. In still another modified structure, both the heat exchange medium supply pipe 57 and the heat exchange medium recovery pipe 56 may be provided on the outflow side of the emission (on the side of the emission outflow-side end plate 52) in the tube stack 30 of the heat recovery system 20.

In the heat recovery system 20 of the embodiment discussed above, the emission inflow-side end plate 42, the tube stack 30, and the emission outflow-side end plate 52 are arranged such that the cutout area 44 of the emission inflow-side end plate 42 face upward along the vertical axis, the cutout areas 34 and 35 of the tube stack 30 respectively face upward and downward along the vertical axis, and the cutout area 55 of the emission outflow-side end plate 52 face downward along the vertical axis. In general, the emission inflow-side end plate 42, the tube stack 30, and the emission outflow-side end plate 52 may be arranged in any arbitrary orientations, as long as the cutout area 44 of the emission inflow-side end plate 42 is aligned with the upper cutout areas 34 of the respective flat tubes 32 included in the tube stack 30 and the cutout area 55 of the emission outflow-side end plate 52 is aligned with the lower cutout areas 35 of the respective flat tubes 32 included in the tube stack 30. In one modified application, the emission inflow-side end plate 42, the tube stack 30, and the emission outflow-side end plate 52 may be arranged such that the cutout area 44 of the emission inflow-side end plate 42 face downward along the vertical axis and the cutout area 55 of the emission outflow-side end plate 52 face upward along the vertical axis. In another modified application, the emission inflow-side end plate 42, the tube stack 30, and the emission outflow-side end plate 52 may be arranged such that the cutout area 44 of the emission inflow-side end plate 42 and the cutout area 55 of the emission outflow-side end plate 52 face horizontally.

Figure 7:
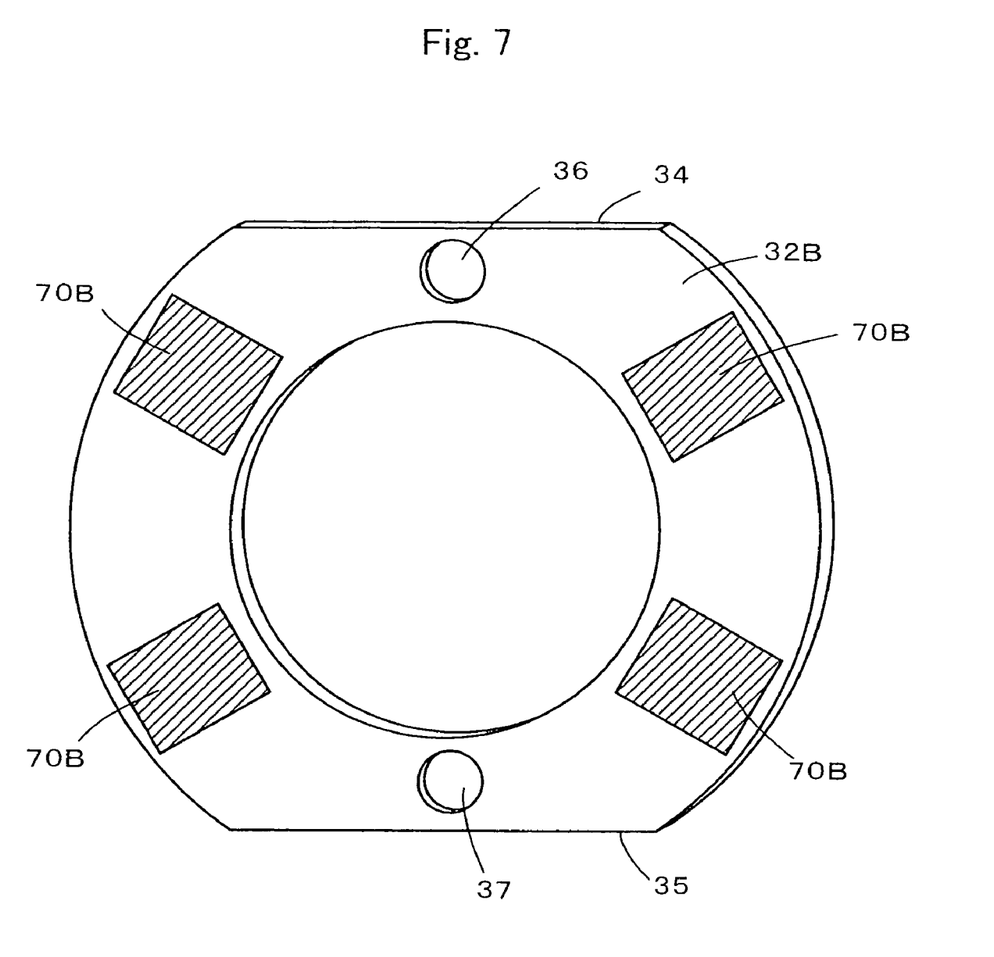
FIG. 7 is a diagrammatic representation of the general structure of another flat tube 32B in accordance with one modified example.
Figure 8:
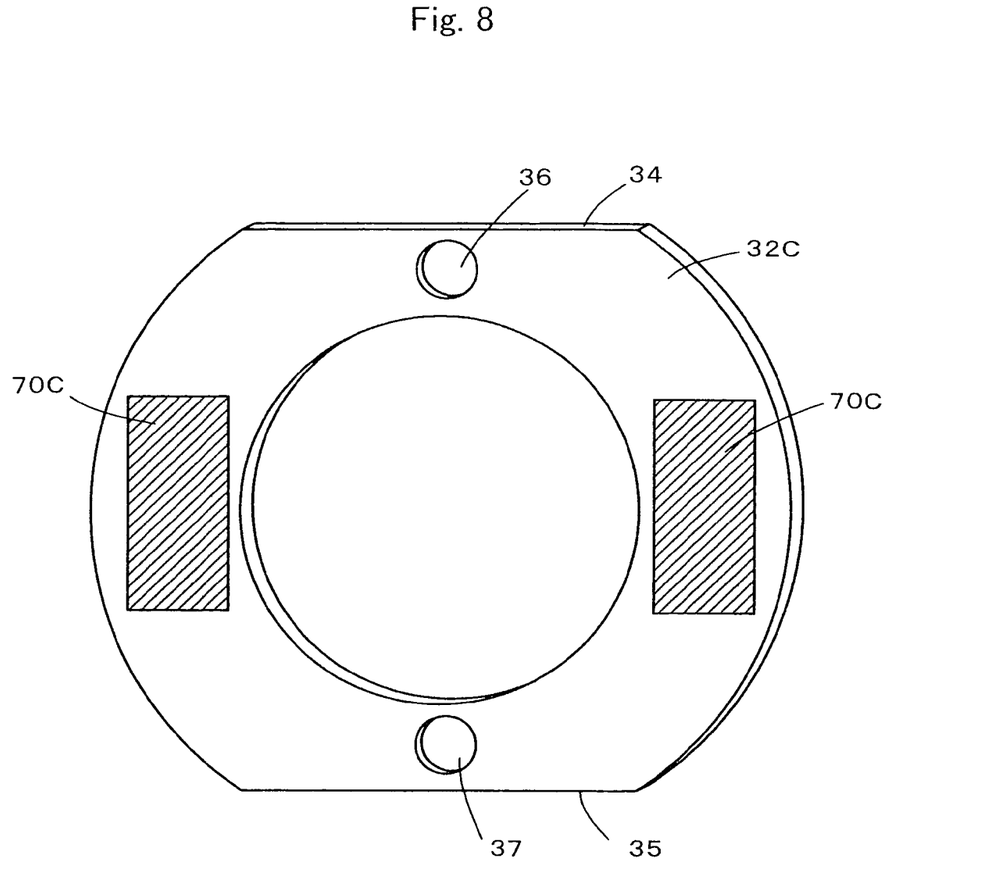
FIG. 8 is a diagrammatic representation of the general structure of still another flat tube 32C in accordance with another modified example.

In the heat recovery system 20 of the embodiment discussed above, the tube stack 30 is created by stacking multiple flat tubes 32. In one modified application, fins may be provided between adjacent flat tubes 32. In this modification, fins may be formed over the whole flat surface of the flat tube 32. Alternatively fins may be formed only part of the flat surface of the flat tube 32, like a flat tube 32B of one modified example with fins 70B shown in FIG. 7 and a flat tube 32C of another modified example with fins 70C shown in FIG. 8. This modified arrangement using the fins desirably increases the heat transmission area, thus improving the heat exchange efficiency of the heat recovery system and allowing for the overall size reduction of the heat recovery system. The fins used in this modified application may be corrugated fins or offset fins. In this modified arrangement using the fins, each fin may be arranged to have a function of holding the tube stack 30 in its stacking direction. This arrangement allows for the thin-wall structure of the flat tubes 32 and increases the strength of the tube stack 30, thus allowing for further size reduction of the heat recovery system.

In the heat recovery system 20 of the embodiment discussed above, each flat tube 32 is formed in the hollow, flat, and circular donut-shape. In one modified application, the flat outer surface of the flat tube 32 may be corrugated. This modified arrangement desirably increases the heat transmission area, thus improving the heat exchange efficiency of the heat recovery system and allowing for the overall size reduction of the heat recovery system.

In the heat recovery system 20 of the embodiment discussed above, each flat tube 32 is formed in the hollow, flat, and circular donut-shape. In one modified application, fins may be formed inside the flat tube 32. This modified arrangement using the fins desirably increases the heat transmission area, thus improving the heat exchange efficiency of the heat recovery system and allowing for the overall size reduction of the heat recovery system. The fins used in this modified application may be corrugated fins or offset fins.

Figure 9:
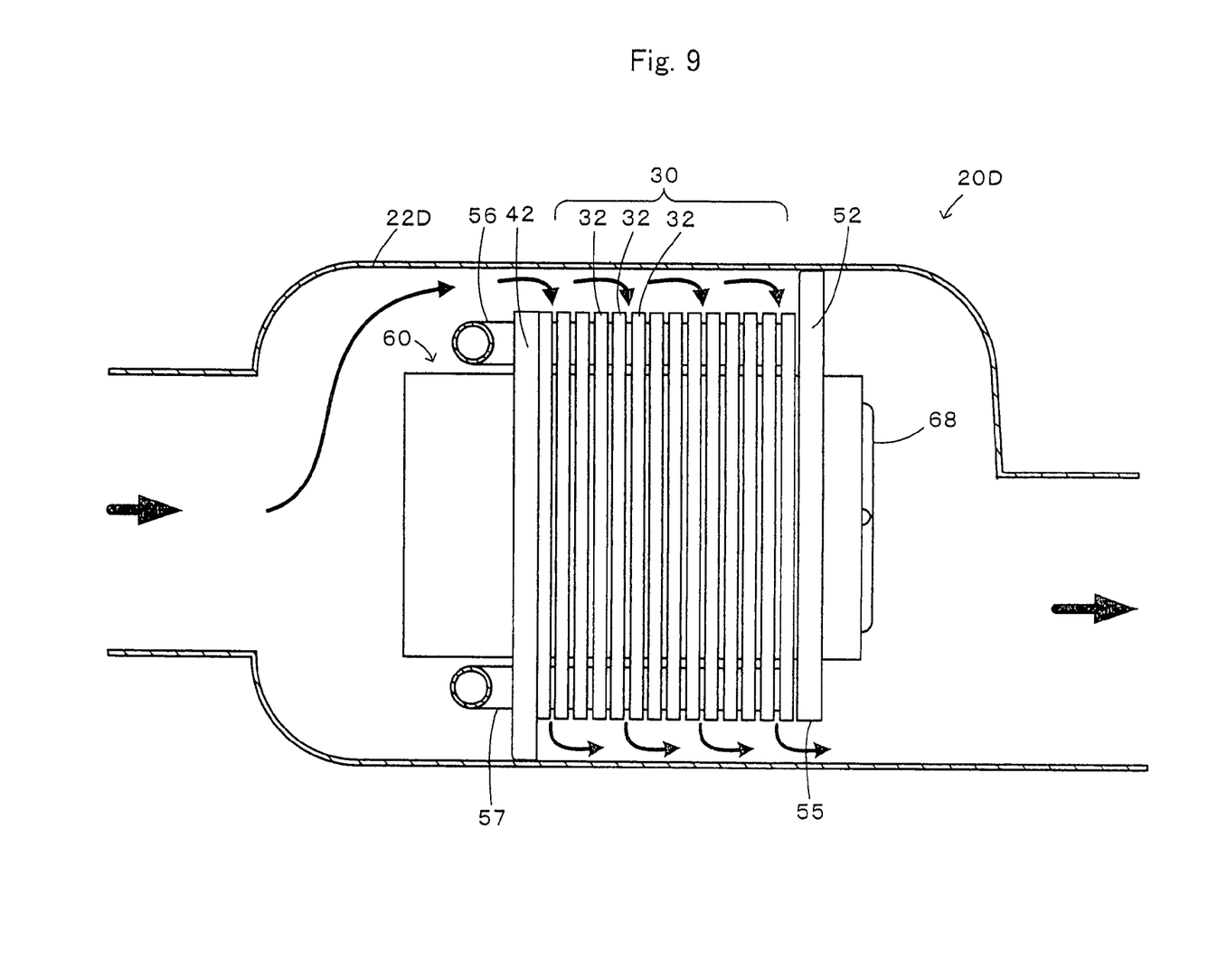
FIG. 9 is a diagrammatic representation of the general configuration of a heat recovery system 20D in accordance with one modified embodiment.

In the heat recovery system 20 of the embodiment discussed above, the casing 22 has the emission inflow path and the emission outflow path that are coaxial with each other. A heat recovery system 20D of one modified example has a casing 22D shown in FIG. 9. The casing 22 is arranged to have an outflow path of the emission that is decentered vertically downward relative to an inflow path of the emission and is formed as a horizontal extension of a flow path of the emission defined by the lower cutout areas 35 of the respective flat tubes 32. This modified arrangement enables the moisture or the water content in the emission condensed and flowed down in the form of dew drops in the process of heat exchange to be readily discharged with the emission flow.

In the heat recovery system 20 of the embodiment discussed above, the shutoff valve 68 is provided on the emission outflow end of the emission flow conduit 60. The shutoff valve 68 may be provided at any arbitrary position to shut off the flow of the emission through the emission flow conduit 60 and release the shutoff of the emission flow. In one modified example, the shutoff valve 68 may thus be provided on the emission inflow end of the of the emission flow conduit 60. In another modified example, the shutoff valve 68 may be provided around the center inside the emission flow conduit 60.

The embodiment and its applications discussed above are to be considered in all aspects as illustrative and not restrictive. There may be many modifications, changes, and alterations without departing from the scope or spirit of the main characteristics of the present invention.

INDUSTRIAL APPLICABILITY

The principle of the present invention is advantageously applicable to the manufacturing industries of heat recovery systems.

The invention claimed is:

1. A heat recovery system configured to recover heat from emission of an internal combustion engine, the heat recovery system comprising:
    a tubular casing;
    a tube stack created by stacking multiple flat tubes, each being formed in a flat, substantially donut shape and being structured to have at least two non-contact areas that are not in contact with inside of the casing,
    wherein the multiple flat tubes are stacked in a stacking direction at preset stacking intervals defined by at least two communication paths and are interconnected in the stacking direction by means of the at least two communication paths, such that the at least two non-contact areas of the multiple flat tubes are respectively aligned in sequence in the stacking direction and the at least two communication paths are respectively aligned in sequence in the stacking direction;
    a heat exchange medium supply pipe connected with respective one communication paths of the at least two communication paths aligned in sequence in the tube stack, in order to supply a heat exchange medium;
    a heat exchange medium recovery pipe connected with respective other communication paths of the at least two communication paths aligned in sequence in the tube stack, in order to recover the heat exchange medium;
    an emission inflow-side end plate located at an emission inflow end of the tube stack on an emission inflow side of the casing and attached to the casing, so as to block respective one non-contact areas of the at least two non-contact areas aligned in sequence in the tube stack;
    an emission outflow-side end plate located at an emission outflow end of the tube stack on an emission outflow side of the casing and attached to the casing, so as to block respective other non-contact areas of the at least two non-contact areas aligned in sequence in the tube stack;
    an emission flow conduit inserted through the inside of the tube stack to have a heat insulating effect and arranged to pass through the tube stack and make a flow of the emission; and
    a shutoff valve provided in the emission flow conduit to shut off the flow of the emission and release the shutoff of the flow of the emission.

2. The heat recovery system in accordance with claim 1, wherein one of the emission inflow-side end plate and the emission outflow-side end plate is attached to the casing with being bonded to one end of the tube stack, and
    the other of the emission inflow-side end plate and the emission outflow-side end plate is attached to the casing without being bonded to the other end of the tube stack.

3. The heat recovery system in accordance with claim 1, wherein the tube stack is created by stacking the multiple flat tubes to be interconnected by means of the at least two communication paths formed in respective neighborhoods of the at least two non-contact areas.

4. The heat recovery system in accordance with claim 1, wherein the heat exchange medium supply pipe and the heat exchange medium recovery pipe are attached either to the emission inflow end of the tube stack on the emission inflow side of the casing or to the emission outflow end of the tube stack on the emission outflow side of the casing.

5. The heat recovery system in accordance with claim 1, wherein the emission inflow-side end plate, the emission outflow-side end plate, and the tube stack are attached to the casing, such that the one non-contact areas of the at least two non-contact areas aligned in sequence in the tube stack and blocked by the emission inflow-side end plate are provided as lower non-contact areas located in a lower portion of the casing and the other non-contact areas of the at least two non-contact areas aligned in sequence in the tube stack and blocked by the emission outflow-side end plate are provided as upper non-contact areas located in an upper portion of the casing.

6. The heat recovery system in accordance with claim 5, wherein the at least two communication paths respectively aligned in sequence in the tube stack are arranged to make an upward flow of the heat exchange medium inside the respective flat tubes.

7. The heat recovery system in accordance with claim 5, wherein the casing is structured to have an emission outflow path arranged to be substantially horizontal with or to be downward inclined relative to the lower non-contact areas blocked by the emission inflow-side end plate.

8. The heat recovery system in accordance with claim 5, wherein the casing is structured to have an axis of an emission outflow path decentered downward relative to an axis of an emission inflow path.

9. The heat recovery system in accordance with claim 1, wherein the emission flow conduit has two hollow pipes of different diameters arranged coaxially across a preset gap formed as a heat insulating layer.

10. The heat recovery system in accordance with claim 1, wherein the shutoff valve is located either on an emission inlet opening of the emission flow conduit or on an emission outlet opening of the emission flow conduit.

11. The heat recovery system in accordance with claim 1, wherein the tube stack has fins provided in at least partial area between respective adjacent pairs of the multiple flat tubes.

12. The heat recovery system in accordance with claim 11, wherein the fins are provided to support the multiple flat tubes in the stacking direction.

* * * * *